United States Patent Office 3,004,026
Patented Oct. 10, 1961

3,004,026
HEXAMETHYLENETETRAMINE HIPPURATE
Alexander Galat, 126 Buckingham Road, Yonkers, N.Y.
No Drawing. Filed Aug. 28, 1959, Ser. No. 836,618
1 Claim. (Cl. 260—248.5)

This invention relates to a new and useful organic compound. More particularly, this invention relates to a new organic compound useful as a urinary tract antiseptic. In an even more specific aspect thereof, this invention relates to hexamethylenetetramine hippurate.

The principal object of this invention is to provide hexamethylenetetramine hippurate, a new organic compound of high utility.

Corollary objects of this invention will become apparent as the description thereof proceeds.

For the better understanding of this invention, the following example is a complete description of a preferred procedure for the preparation of the new and useful compound of this invention.

Example

One hundred and seventy nine grams (one mole) hippuric acid (benzoyl glycine) and 140 g. (one mole) hexamethylenetetramine were heated under reflux in 500 ml. methanol. The small amount of water necessary to give a clear, homogeneous solution was added to the resulting reaction mixture which was then evaporated to dryness. The residue soon crystallized, a procedure that could be greatly accelerated by seeding with crystals of hexamethylenetetramine hippurate from a previous preparation. The resulting solid product was broken up and pulverized.

Hexamethylenetetramine hippurate is stable on exposure to air and is soluble in water and alcohol. It melts at 105–110° C.

Hexamethylenetetramine is a well known chemical compound that appears on the market under such trade names as Aminoform, Formin, Hexamine, Methenamine, Urotropine, et cetera. For convenience this compound will be designated Methenamine throughout the remainder of this specification while the new compound of this invention will be correspondingly designated Methenamine hippurate hereinafter. Methenamine is a monacid base and accordingly unites with an equimolecular quantity of the monobasic hippuric acid to form the new compound of this invention.

Methenamine is a well known, safe and effective urinary antiseptic. (See, for example, The Dispensatory of the United States of America, 25th edition, page 844.) The antiseptic properties of Methenamine are due to the formaldehyde formed as a result of the hydrolysis of Methenamine in acid medium, specifically at a pH below 6.0. At a pH of 6.0 or above, and particularly in an alkaline medium, Methenamine is completely devoid of antiseptic action.

While normal urine is usually very slightly acidic, urine generally exhibits an alkaline reaction when an infection of the urinary tract exists. This is due primarily to bacterial decomposition of urea and other nitrogenous elimination products with the production of ammonia. Obviously then, more frequently than not pathogenic conditions which require the beneficial antiseptic action of Methenamine for their amelioration produce an environment in which Methenamine is incapable of exhibiting an antiseptic action. Also, it is to be noted that the hydrolysis of Methenamine produces ammonia and accordingly, aside from any other considerations, hydrolysis of Methenamine tends to produce an environment that retards and finally prevents further hydrolysis of Methenamine.

Many attempts have been made to eliminate the above described limitation of Methenamine as a urinary antiseptic. Thus, it has been recommended that a salt exhibiting an acid reaction, such as ammonium chloride, ammonium nitrate, sodium acid phosphate or the like, be administered together with Methenamine. However, impractically and/or dangerously high dosages of such salts must be given in order to make the urine acidic and even so acidification of the urine does not occur with all patients.

Another approach that has been employed in an attempt to solve the difficulty involves administering Methenamine in the form of a salt with an organic acid. It is postulated that decomposition of such a salt in the urine will result in the production of the acid medium required for manifestation of the antiseptic action of Methenamine.

Salts of Methenamine with such acids as anhydromethylenecitric, acetylsalicylic, borocitric, citrosulfuric, mandelic, phenoxyacetic, salicyclic, sulfosalicylic, salicyloxyacetic, sulfoxylic, and the like have been prepared and tested as urinary antiseptics with invariably unsuccessful results. It will be noted that all of these acids are, from the standpoint of the human body, foreign substances exhibiting, to a greater or lesser degree, toxic physiological effects. The human body attempts to eliminate these substances by various metabolic and other reactions, one of which involves neutralization of these foreign acids. To accomplish this reaction an abnormally large amount of alkali is excreted into the urine, this amount being so great that the urine exhibits an even higher pH than prior to the administration of the salt. As a result, Methenamine therapy through use of such salts is erratic, unreliable and, more frequently than not, completely ineffective.

Hippuric acid, while present in greatest concentrations in the urine of herbivorous animals, is also a normal but comparatively minor component of human urine. When administered to humans even in extremely large amounts (e.g., 15 g. daily) hippuric acid is completely devoid of toxicity and does not result in any unusual physiological action such as renal adjustment to the acid load with increased excretion of ammonia.

As a result of the above favorable properties of hippuric acid, oral administration thereof produces and maintains an acid reaction in the urine. This is demonstrated by the data of the following table showing typical results obtained by oral administration of hippuric acid to a human subject:

| Day | Daily Dose Hippuric Acid, Grams | pH of Urine |
|---|---|---|
| 1 | 0 | 6.4 |
| 2 | 16 | 6.8 |
| 3 | 16 | 5.7 |
| 4 | 8 | 5.3 |
| 5 | 8 | 5.2 |
| 6 | 12 | 5.2 |
| 7 | 12 | 5.3 |
| 8 | 12 | 5.4 |
| 9 | 0 | 5.3 |
| 10 | 0 | 5.7 |
| 11 | 0 | 6.8 |
| 12 | 0 | 6.7 |
| 13 | 0 | 6.5 |

It will be noted that prior to the start of the experiment, the subject had urine exhibiting a typical very slightly acid reaction. Soon after the initiation of the oral administration of hippuric acid (in divided doses) at a rate of 8 to 16 grams per day the urine became distinctly acid (pH 5.2–5.3) and remained so throughout the period of administration of the hippuric acid. Soon after termination of oral administration of hippuric acid the reaction of the urine returned to the original just barely acidic condition.

The Methenamine hippurate of this invention acts similarly with respect to its effect on urine pH and because of the acid environment resulting, the Methenamine portion of the compound exhibits its beneficial antiseptic action. Thus, administration of Methenamine hippurate at a rate of 5 g. per day is well tolerated and no toxic effects are observed. The pH of the urine is brought to below 6.0 and the Methenamine portion of the compound produces a strongly bactericidal effect.

Be it remembered, that while this invention has been described in connection with specific details and specific embodiments thereof, these details and embodiments are illustrative only and are not to be considered limitations on the spirit and scope of said invention except insofar as these may be incorporated in the appended claim.

I claim:
Hexamethylenetetramine hippurate.

References Cited in the file of this patent
UNITED STATES PATENTS

| | | |
|---|---|---|
| 2,449,040 | Schideler et al. | Sept. 7, 1948 |
| 2,764,581 | Scholz et al. | Sept. 25, 1956 |

OTHER REFERENCES

Sidgwick: Organic Chemistry of Nitrogen, page 42, Oxford University Press, 1937.

Chemical Abstracts, vol. 49, col. 16,002 (1955).

Smolin et al.: "s-Triazines and Derivatives," page 551, Interscience Publishers Inc., February 1959.